(12) United States Patent
Bowling

(10) Patent No.: US 6,702,226 B1
(45) Date of Patent: Mar. 9, 2004

(54) DEVICE FOR AIDING REWINDING A FISHING REEL

(76) Inventor: Kyle Bowling, 8075 McEwen Rd., Centerville, OH (US) 45458

( * ) Notice: Subject to any disclaimer, the term of this patent is extended or adjusted under 35 U.S.C. 154(b) by 6 days.

(21) Appl. No.: 10/198,000

(22) Filed: Jul. 18, 2002

(51) Int. Cl.$^7$ .......................... B65H 49/26; B65H 49/32
(52) U.S. Cl. ................ 242/597.4; 242/597.7; 242/597.8; 242/125.2; 242/139; 242/902
(58) Field of Search .............. 242/597, 597.8, 242/902, 125.2, 138, 139, 140, 422, 423.1, 597.4, 597.7

(56) References Cited

U.S. PATENT DOCUMENTS

| | | | | |
|---|---|---|---|---|
| 351,427 A | * | 10/1886 | Danelius | 242/139 |
| 1,414,971 A | * | 5/1922 | Ahl | 242/139 |
| 2,239,226 A | * | 4/1941 | Graham, Sr. | 242/139 |
| 3,539,124 A | * | 11/1970 | Belokin, Jr. | 242/138 |
| 3,638,878 A | * | 2/1972 | Morris | 242/139 |
| 4,106,723 A | * | 8/1978 | Couture | 242/139 |
| 4,634,077 A | * | 1/1987 | Wilson | 242/139 |
| 5,218,779 A | * | 6/1993 | Morgan et al. | 242/597.8 |
| 5,322,236 A | * | 6/1994 | Smith | 242/129.8 |

* cited by examiner

Primary Examiner—John M. Jillions
(74) Attorney, Agent, or Firm—R. William Graham

(57) ABSTRACT

A device for aiding rewinding a fishing reel by an individual includes a suction cup base having a convex bottom and top portion having a central hub, a screw threadably connected to the hub at a first end and having a second end extending therefrom, and an elongated pole member threadably connected to the second end of the screw which extends outwardly from the hub and is of a diameter to be received through the hub of a spool of line. A spool retainer is provided which is frictionally slidably connected to the pole member to retain a spool of line between the hub and retainer.

14 Claims, 1 Drawing Sheet

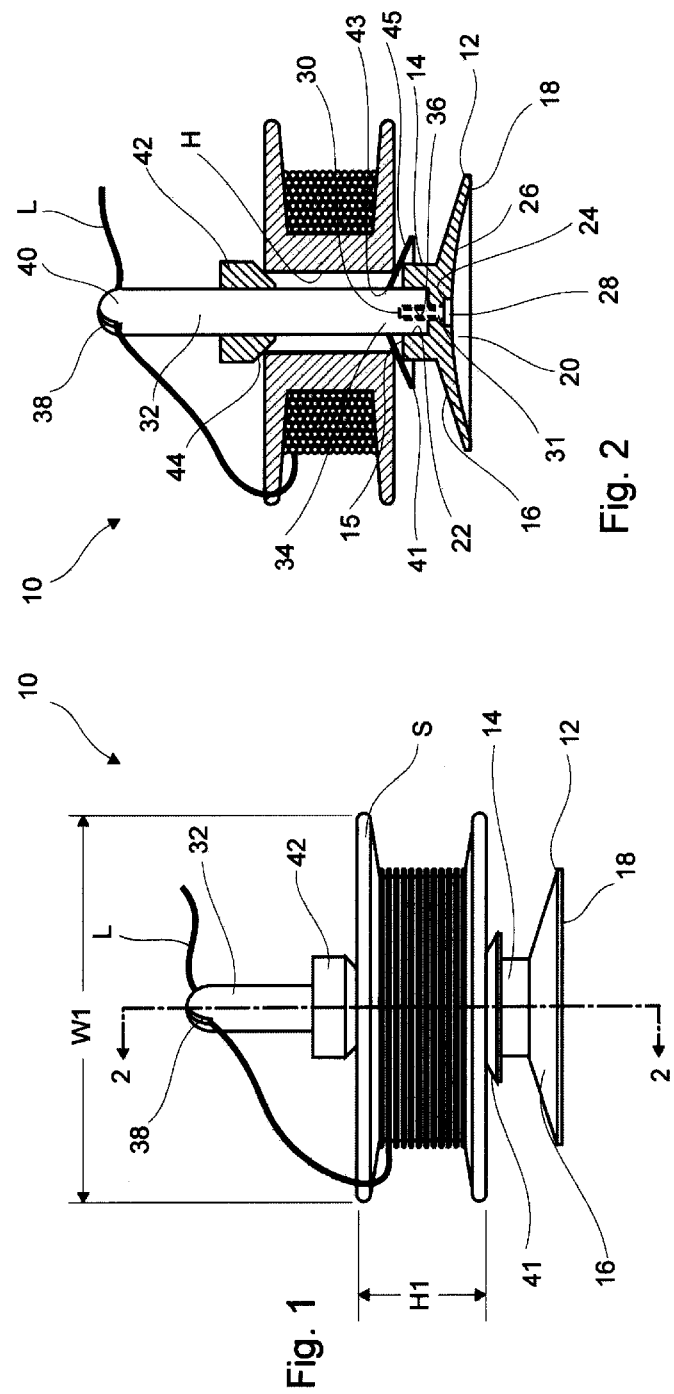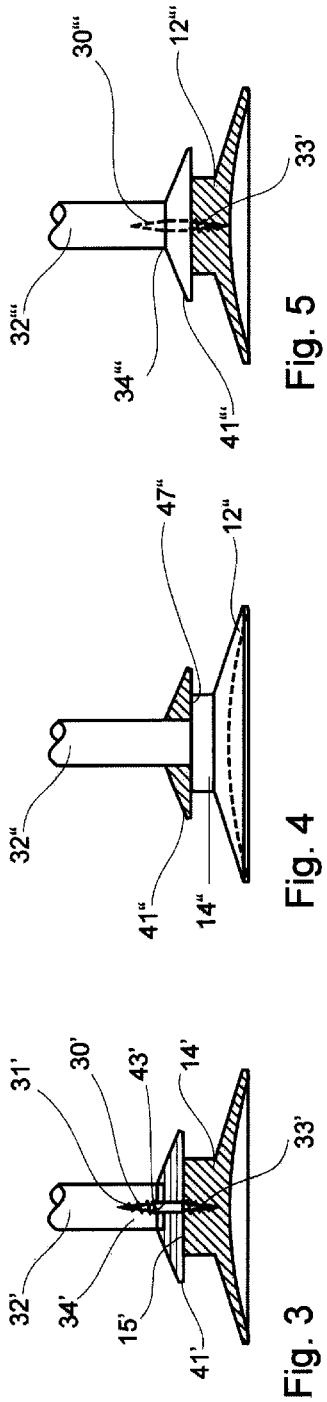

DEVICE FOR AIDING REWINDING A FISHING REEL

BACKGROUND OF THE INVENTION

1. Field of the Invention

This invention relates to fishing, and more particularly, to a device for aiding in the rewinding of a fishing reel, wherein the device is used by fishermen to transfer fishing line from the spool to the reel.

2. Prior Art

A fishing sportsman frequently changes the line on his reel. The change is either to replace old worn line or replace the existing line with a different line for a particular kind of fishing, for example, spin- or fly-fishing. The replacement lines are stored on spools, pulled from the spool and rewound onto the fishing reel.

There have been provided a number of devices to aid in this regard. However, there remains a significant need to improve such rewinding aids to render the process of rewinding the reel in a quick and user friendly manner.

SUMMARY OF THE INVENTION

It is an object to improve devices which aid in rewinding a reel.

It is another object to provide an improved device for aiding in the rewinding of a reel.

It is yet another object to provide a relatively inexpensive device for holding a spool of line which is highly versatile for use in rewinding a line onto a reel.

It is another object to provide a device for aiding in rewinding a reel which lends itself to co-marketing with replacement spool line.

Accordingly, the present invention is directed to a device for aiding rewinding a fishing reel by an individual. The device includes a suction cup base having a convex bottom and top portion having a central hub, a screw threadably connected to the hub at a first end and having a second end extending therefrom, an elongated pole member threadably connected to the second end of the screw which extends outwardly from the hub and is of a diameter to be received through the hub of a spool of line. A spool retainer is frictionally slidably connected to the pole member to retain a spool of line between the hub and retainer.

The retainer is sufficiently frictionally disposed on the pole to permit the spool of line to be held without substantial transverse movement on the pole. In addition, the present invention permits a variety of different sized spools to be used.

The device provided readily enables it to be fixed to an object, such as a surface of a boat. Once affixed to the surface, the retainer can be removed to enable the spool of line to be supported on the pole member. The retainer is then replaced to retain the spool which is to be rotated about the pole while line is being transferred from the spool to the fishing reel.

A transverse slit can be formed across an end of the pole member. The slit is of such a narrow width so as to provide a locking mechanism for the fishing line placed within it. The slit acts to prevent knots and tangles from forming in the fishing line when said line is not in use.

Other objects and advantages will be readily apparent to those skilled in the art upon viewing the drawings and reading the detailed description hereafter.

BRIEF DESCRIPTION OF THE DRAWINGS

FIG. 1 is a side view of a device having a spool of line thereon which provided in accordance with this invention; and FIG. 2 is a cross sectional view taken on line 2—2 of FIG. 1.

FIG. 3 is a cross sectional view of a part of an alternative embodiment of the invention.

FIG. 4 is a cross sectional view of a part of yet another alternative embodiment of the invention.

FIG. 5 is a cross sectional view of a part of still another alternative embodiment of the invention.

DESCRIPTION OF THE PREFERRED EMBODIMENTS

While the principles of the present invention find a particular utility in a fishing line device, it will be understood that the device 10 of the present invention may be utilized in other combinations. By way of exemplary disclosure of the best mode of practicing the invention, and by way of enabling one of ordinary skill in the art to practice my invention, one embodiment is shown in FIGS. 1–2.

In FIG. 1, the device 10 includes suction cup base 12 for securing the device 10 to a fixed smooth flat and substantially non-porous object which can include, for example, a tackle box, table top, a boat surface, etc. The suction cup 12 is a cup-shaped object of rubber or flexible polymer and has a generally cylindrical hub 14 with outwardly flaring walls 16 terminating in a circular lip 18, thereby to circumscribe a cup-like cavity or recess 20. The suction cup 12 enables a partial vacuum when it is collapsed or pressed against a flat adherent surface, thus drawing the suction cup 12 into firm assembly with the adjoining surface.

As seen in FIG. 2, the hub 14 includes an interiorly formed generally cylindrical open surface 22 and further includes a centrally disposed bore 24 in a bottom surface 26 which is shaped to retainably receive a screw head 28. Another end 30 of the screw 31 extends upward from the surface 26.

A pole member 32 is provided and is generally cylindrical and of a diameter to be receivably connected to the surface 22. A bottom 34 of the pole member 32 includes an open surface 36 configured to threadably receive the end 30 of the screw 31. The bottom 34 seats against the surface 26 when pole member 32 is properly threadably connected to the hub 14. The pole member 32 can be configured with a transverse slit 38 which can be formed across an end 40 of the pole member 32. The slit 38 is of such a narrow width so as to provide a locking mechanism for the fishing line L placed within it. The slit 38 acts to prevent knots and tangles from forming in the fishing line L when said line L is not in use. It also provides an efficient means for the user to locate the fishing line L the next time the user desires to transfer fishing line L to a reel.

A washer 41 is disposed on a collar 15 of the hub 14. The washer 41 includes tapered ring-like retainer member, which can be made of a metal or plastic material which is designed with acceptable low friction surface. An inner open surface 43 is shown large enough to permit the passage of the pole member 32 therethrough. The spool S can be placed over the pole member 32 whereon its hub H rests on a portion of tapered surface 45 of the washer 41. The tapered surface 45 is large enough to accommodate a range of different sized hubs.

While the particular geometries are described, it is contemplated that other geometries may be employed. Further, the pole member 32 is configured to have an outer diameter which is small enough to permit slidably receipt of a hub H of a spool S.

A spool retainer 42 is frictionally slidably connected to the pole member 32 to retain the spool S between the hub 14 and retainer 42. The retainer 42 is cone-shaped at one end 44, i.e., it is tapered. Likewise, the retainer 42 can be made of a metal or plastic material which is designed with acceptable low friction tapered surface on end 44. The tapered end 44 can be used to seat within the hub H. The surface 45 and the washer 41 provide suitable bearing surfaces upon which the spool S can rotate. Also, a range of different diameter spool hubs can be employed with the present invention. The pole member 32 and retainer 42 can be made of a strong and durable plastic.

As shown, the pole member 32 stands generally normal to the base suction cup 12. The spool S is shown to have a height H1 and width W1, however, the pole member 32 can accommodate a variety of height and width sizes, wherein the width size is reasonably unrestricted by the device's 10 configuration.

FIG. 3 shows another washer 41' type. Here, the pole member 32' rests on top of the washer 41' and an inner open surface 43' is large enough to permit insertion of a double ended screw 30' therethrough. The screw 30' has one threaded end 31' threaded to the pole member 32' and another threaded end 33' to hub 14'.

By virtue of having the device 10, a convenient means is provided for one person to change the fishing line L on his reel when it is not possible to have the assistance of another person. Also, the device 10 of the present invention provides a relatively inexpensive tool which can aid in rewinding a reel and which can be co-marketed with replacement spool line. For example, the pole member 32 can be unthreaded from the suction cup 12 and packaged along with a replacement spool S having line L as a promotional item with minimal cost to the manufacturer.

FIG. 4 shows a version of the invention having the pole member 32" integrally formed with the suction cup 12". In this version, the washer 41" would slide over the pole member 32" and sit on a collar 47" of the hub 14".

FIG. 5 depicts a version wherein the pole member 32''' has washer 41''' integrally formed to bottom 34'''thus forming and enlarged end of pole member 32'''. The connection to the suction cup 12''' is similar to that previously described.

The above described embodiment is set forth by way of example and is not for the purpose of limiting the present invention. It will be readily apparent to those skilled in the art that obvious modifications, derivations and variations can be made to the embodiment without departing from the scope of the invention. For example, other materials not known to the inventor but which may be discovered hereinafter to enable the operation of the invention should be deemed within such modifications, derivations and variations. Accordingly, the claims appended hereto should be read in their full scope including any such modifications, derivations and variations.

What is claimed is:

1. A device for aiding rewinding a fishing reel by an individual, which includes:
   a suction cup base having a convex bottom and top portion having a central hub;
   fastener connected to said hub at a first end and having a second end extending therefrom;
   an elongated pole member connected to said second end of said fastener and which extends outwardly from said hub when connected thereto and is of a diameter to be received through a hub of a spool of line; and
   a spool retainer frictionally slidably connected to said pole to retain the hub of the spool of line between said hub of said suction cup and said retainer wherein said retainer, has a tapered end for engaging the hub of the spool and an inner open surface which is of a slightly greater fixed diameter than said pole to permit said retainer to be slidably moved along said pole without threading and to provide for friction retention between said retainer and said pole member to permit the spool of line to be held without substantial transverse movement on said pole during rotational movement of the spool.

2. The device of claim 1, wherein said retainer and said hub of said suction cup are of a larger diameter than said pole member to permit retention of a range of spool hub diameters.

3. The device of claim 1, wherein said pole member is generally cylindrical.

4. The device of claim 1, wherein said pole member includes a transverse slit formed across an end thereof and is of a narrow width to provide a locking mechanism for the fishing line when placed therein.

5. The device of claim 1, wherein said hub is configured with a tapered surface, said tapered end and said tapered surface to serve as a bearing for a hub of the spool.

6. The device of claim 1, wherein said device further includes a ring-like retainer member disposed on said hub which has a tapered surface and the spool of line is retained between said tapered end and said tapered surface which serve as a bearing for a hub of the spool.

7. A device for aiding rewinding a fishing reel by an individual, which includes:
   a suction cup base having a convex bottom and top portion;
   an elongated pole member having an enlarged end which is configured with an outwardly tapered surface and a remainder of said pole member being of a diameter to be received through a hub of a spool of line;
   a fastener interconnecting said top portion and a bottom of said enlarged end; and
   a spool retainer frictionally slidably connected to said pole, wherein said retainer has a tapered end for engaging the hub of the spool and an inner open surface which is of a slihtly greater fixed diameter than said pole to permit said retainer to be slidably moved along said pole without threading and to provide for friction retention between said retainer and said pole member to permit the spool of line to be held without substantial transverse movement on said pole during rotational movement of the spool and wherein the spool of line is retained between said tapered surfaces which serve as a bearing for a hub of the spool.

8. The device of claims 7, wherein said retainer and enlarged end are of a larger diameter than said pole member to permit retention of spool hub diameters.

9. The device of claim 7, wherein said pole member is generally cylindrical.

10. The device of claim 7, wherein said pole member includes a transverse slit formed across an end thereof and is of a narrow width to provide a locking mechanism for the fishing line when placed therein.

11. A device for aiding rewinding a fishing reel by an individual, which includes:
   a suction cup base having a convex bottom and top portion having a central hub, an elongated pole member which extends outwardly from said hub, said pole member having a smaller diameter than said hub such that a collar of said hub surrounds said pole member and wherein said pole member is of a diameter to be received through a hub of a spool of line and wherein said collar is configured with a tapered surface; and a spool retainer frictionally slidably connected to said pole and having an outwardly tapered surface to retain the hub of the spool of line between said tapered surfaces which serve as a bearing for a hub of the spool wherein said retainer has an inner open surface which is of a slightly greater fixed diameter than said pole to permit said retainer to be slidably moved along said pole without threading and provide for friction retention between said retainer and said pole member and to permit the spool of line to be held without substantial transverse movement on said pole during rotational movement of the spool.

12. The device of claim 11, wherein said retainer and said hub of said suction cup are of a larger diameter than said pole member to permit retention of a range of spool hub diameters.

13. The device of claim 11, wherein said pole member is generally cylindrical.

14. The device of claim 11, wherein said pole member includes a transverse slit formed across an end thereof and is of a narrow width to provide a locking mechanism for the fishing line when placed therein.

* * * * *